(12) United States Patent
Newhan (10) Patent No.: US 11,434,968 B2
(45) Date of Patent: Sep. 6, 2022

(54) VEHICLE SHOCK ABSORBER

(71) Applicant: Mark Brendan Newhan, Lakeside, CA (US)

(72) Inventor: Mark Brendan Newhan, Lakeside, CA (US)

( * ) Notice: Subject to any disclaimer, the term of this patent is extended or adjusted under 35 U.S.C. 154(b) by 82 days.

(21) Appl. No.: 16/800,943

(22) Filed: Feb. 25, 2020

(65) Prior Publication Data

US 2020/0271185 A1   Aug. 27, 2020

Related U.S. Application Data

(60) Provisional application No. 62/810,117, filed on Feb. 25, 2019.

(51) Int. Cl.
*F16F 9/084* (2006.01)
*F16F 9/06* (2006.01)
*F16F 9/36* (2006.01)

(52) U.S. Cl.
CPC .............. *F16F 9/084* (2013.01); *F16F 9/067* (2013.01); *F16F 9/369* (2013.01)

(58) Field of Classification Search
CPC .... F16F 9/06; F16F 9/512; F16F 9/062; F16F 9/36; F16F 9/5123; F16F 9/48; F16F 2228/066; F16F 9/065; F16F 9/084; F16F 9/365; F16F 9/50; F16F 9/0281; F16F 9/067; F16F 9/088; F16F 9/18; F16F 9/3228; F16F 9/363; F16F 9/5126; F16F 9/516; B60G 15/12; B60G 2500/10
See application file for complete search history.

(56) References Cited

U.S. PATENT DOCUMENTS

| | | | | |
|---|---|---|---|---|
| 4,720,085 A * | 1/1988 | Shinbori | .................. | B60G 3/01 188/266.5 |
| 5,400,880 A * | 3/1995 | Ryan | ..................... | B60G 15/00 188/314 |
| 5,593,007 A * | 1/1997 | Siltanen | .................... | F16F 9/06 188/269 |
| 6,340,153 B1 * | 1/2002 | Miesner | .................... | F16F 9/18 188/316 |
| 8,317,172 B2 * | 11/2012 | Quinn | .................... | B60G 17/06 267/220 |
| 8,640,835 B2 * | 2/2014 | Holman | .................. | F16F 9/063 188/266 |
| 8,701,846 B2 * | 4/2014 | Reybrouck | ............... | F16F 9/49 188/322.15 |
| 8,807,300 B2 * | 8/2014 | Marking | ................. | F16F 9/062 188/297 |
| 2002/0112931 A1 * | 8/2002 | Forster | .................... | F16F 9/062 188/315 |

(Continued)

*Primary Examiner* — Robert A. Siconolfi
*Assistant Examiner* — Mahbubur Rashid
(74) *Attorney, Agent, or Firm* — Donn K Harms (57) ABSTRACT

A vehicle shock absorber has a body extending between a first end and a second end. Translation of a primary shaft within an interior cavity of the body communicates a first volume of fluid within the interior cavity to a secondary reservoir where it increases pressure in a gas cavity therein. The primary shaft has an annular member engaged thereon which contacts a bump shaft slidably located in an opening at the first end of the body. The contact of the annular member translates the bump shaft within the interior cavity to cause communication of a secondary volume of the fluid to the secondary reservoir.

7 Claims, 3 Drawing Sheets

(56) References Cited

U.S. PATENT DOCUMENTS

| | | | |
|---|---|---|---|
| 2003/0051957 A1* | 3/2003 | Lemieux | F16F 9/3485 188/322.15 |
| 2005/0077131 A1* | 4/2005 | Russell | F16F 9/342 188/314 |
| 2005/0178626 A1* | 8/2005 | Turner | F16F 9/526 188/322.2 |
| 2006/0027954 A1* | 2/2006 | Nesbitt | F16F 9/065 267/64.11 |
| 2006/0289258 A1* | 12/2006 | Fox | F16F 9/44 188/322.21 |
| 2008/0018035 A1* | 1/2008 | Porter | F16F 9/467 267/218 |
| 2009/0200127 A1* | 8/2009 | Janes | F16F 9/3405 188/314 |
| 2009/0314592 A1* | 12/2009 | Nygren | F16F 9/44 188/266.6 |
| 2011/0017558 A1* | 1/2011 | Nygren | F16F 9/516 188/266.2 |
| 2011/0094833 A1* | 4/2011 | Marking | B60G 17/06 267/220 |
| 2011/0101579 A1* | 5/2011 | Polakowski | F16F 9/3228 267/64.26 |
| 2011/0315494 A1* | 12/2011 | Marking | F16F 9/49 188/322.15 |
| 2012/0018263 A1* | 1/2012 | Marking | F16F 9/516 188/266.2 |
| 2012/0193849 A1* | 8/2012 | Runkel | F16F 9/06 267/217 |
| 2013/0228404 A1* | 9/2013 | Marking | F16F 9/065 188/266.2 |
| 2015/0290991 A1* | 10/2015 | Cox | B60G 13/06 188/269 |
| 2016/0363185 A1* | 12/2016 | Noguchi | F16F 9/585 |

* cited by examiner

VEHICLE SHOCK ABSORBER

This application claims priority to U.S. Provisional Patent Application Ser. No. 62/810,117, filed on Feb. 25, 2019, which is incorporated herein in its entirety by this reference thereto.

BACKGROUND OF THE INVENTION

1. Field of Invention

The invention relates to vehicle suspensions. More particularly the disclosed device relates to an improved shock absorber or shock dampening system for a motor vehicle which provides better overall performance and improved bottoming resistance of the shock through the provision of a hydro-pneumatic resisting bump shaft, which translates under resistance subsequent to the full travel of the primary shaft movement within the shock body.

2. Prior Art

On vehicles which travel on and off roads, the vehicle is supported on a suspension system which conventionally employ what is known as a shock absorber. Shock absorbers are in reality, a shock "damper" which is a mechanical or hydraulic device designed to absorb and dampen shock impulses and resulting movement of spring-supported suspension components. The shock absorber accomplishes this task by converting the kinetic energy of the shock, communicated to a wheel from an uneven road or trail surface, into another form of energy (typically heat) which is then dissipated. Most shock absorbers dampen the ongoing back and forth force and movement of the suspension and spring using a form of resistance employing fluid and viscous friction.

In modern vehicles most shock absorbers are what is known as a mono-tube shock absorber. Such mono-tube shocks employ a coil spring and a shock absorber which is formed by a single tube or the pressure tube, and function using two pistons and a fluid and a gas. Conventionally, these pistons are called the working piston and the dividing or floating piston, and they move in relative synchrony within the pressure tube in response to changes in road smoothness.

The two pistons in operation have separate functions. One has a compression and rebound circuit that is backed up by spring steel valve shims. These shims flex when the dampening piston travels through the oil fluid. The spring resistance of these shims are what control the dampening. The reservoir dividing piston separates the oil and nitrogen charge. Conventionally, nitrogen gas is employed in such shock absorbers and is held under pressure therein and can actually provide a softened support of the vehicle weight during use. In operation during suspension movement from the ground surface and wheel bouncing, the shock absorbers, being engaged to the suspension and body, will operate to smooth out the ride of the vehicle and to minimize vehicle body motion.

However, where the road surface and vehicle speed result in an excessive travel of the suspension and engaged shock absorber, conventionally there is employed a bottoming or bump cushion to physically limit any further shock component travel and thereby prevent damage to the shock absorber. The device and method herein provides an enhancement to conventional fixed bump cushions through the provision of a translating bump cushion limiting and dampening the force communicated to both the shock and vehicle body during an excessive travel situation.

The forgoing examples of related art as to modern shock absorbers employed with vehicles, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF INVENTION

The device herein provides a solution to the shortcomings of conventional vehicle-mounted shock absorbers. The disclosed device herein integrates a conventional mono tube style shock with a hydro-pneumatic bottoming cushion or stop. The disclosed shock absorbing system provides a built-in dampened bottoming resistance that operates to limit shock and suspension component travel. The bottoming resistance components operate independently from the conventional dampening function of a shock absorber.

The shock absorbing device herein employs a conventional mono tube shock absorber operation, conventionally provided by both factory original equipment and aftermarket shocks, where shims and/or valving control dampened movement of the primary shaft through oil. However, the device herein is configured with an additional translating bump shaft which translates to accelerate gas compression to significantly enhance bottoming or bump cushioning system, which is lacking in the art.

As noted, both conventional factory original equipment shocks and after market shock absorbers and suspensions, employ fixed and separate bump-cushions or bottoming resistance components which are formed from a compressible material such as neoprene rubber or a cellulose. Such conventional bump-cushions are adapted to restrain movement of the suspension past a point and also attempt to cushion the last two or three inches of wheel travel, or motion, of the suspension. These conventional compressible material style bump cushions are provided to prevent metal to metal contact of the suspension components and the internal components of the shock absorber (dampener) which will cause catastrophic damage to any vehicle and shock system.

Instead of such fixed-positioned conventional compressible cushioning materials which contact and prevent overtravel, the shock absorber herein provides a translating bump shaft which will move against resistance from communicated hydro-pneumatic pressure within the shock. In operation, a shock primary shaft operates in a conventional fashion to move through a fluid during both compression and rebound strokes.

The resistance to such movement during both the compression stroke and rebound stroke is provided by a primary shaft movement through a fluid such as hydraulic oil. The volume of fluid flowing from the compression chamber, which is in front of a valved seal, through the compression fluid circuit to a rebound chamber, which is behind the fluid valve, is controlled by a compression valve or valving in the compression fluid circuit. By compression valve or valving is meant any valve which is adjustable to allow more or less of the fluid or oil to communicate through the compression fluid circuit from the compression chamber to the rebound chamber.

Currently, flexible shims which bend under a determined pressure, provide such a compression valve and are mounted on a first side of a valved seal having the compression fluid circuit running therethrough. However, other compression valves which will control a volume of the fluid communicating through the compression circuit, as would occur to those skilled in the art, may be used such as metal or plastic valve cylinders or electronically controlled valves operated by the vehicle computer. It is the resistance to movement toward the compression chamber end of the shock absorber, caused by the compression valve controlling the fluid volume movement to the rear or rebound chamber, which dampens or slows movement of the wheel of the vehicle in an upward direction away from the road surface.

In the same fashion the volume of oil or fluid flowing from the rebound chamber back to the compression chamber, during reverse movement of the primary shaft translating inside the body of the shock absorber, is controlled by a rebound valve in the rebound fluid circuit.

By rebound valve or valving is meant any valve which is adjustable to allow more or less of the fluid or oil to communicate through the rebound fluid circuit from the rebound chamber to the compression chamber. Currently flexible shims which bend under a determined pressure provide such a compression valve and are mounted on a second side of a valved seal having the rebound fluid circuit running therethrough. However other rebound valves which will control a volume of the fluid communicating through the rebound circuit as would occur to those skilled in the art may be used. Such can be a metal or plastic valve component or could be an electronically controlled valve as noted above. It is the resistance to movement toward the rebound chamber end of the shock absorber, caused by the rebound valve controlling the fluid volume movement to compression chamber, which dampens or slows movement of the wheel operatively engaged on the suspension.

The dampening of movement during this rebound stroke provides the resistance to bouncing of the wheel being controlled by the shock absorber. Thus, the movement of the primary shaft of the shock absorber is dampened by the fluid flow in both translation directions inside the interior cavity.

As noted, in the device herein, the compression circuit and rebound circuit are controlled in the conventional fashion using such a compression fluid circuit and rebound fluid circuit. The volume of fluid flow in the compression circuit is controlled by the compression valve formed of an array of flexible valving discs made from spring steel which flex under fluid pressure to control the volume of fluid moving through the compression valve. The volume of fluid flow in the rebound circuit is controlled in the same fashion by a rebound valve which is also formed in array of flexible valving discs made from spring steel which flex under fluid pressure to control the volume of fluid moving through the valve from the compression chamber back to the rebound chamber.

The primary shock shaft travels or translates axially through the interior cavity of the body of the shock absorber through and toward both the compression chamber and rebound chamber in a conventional fashion. However, in the device herein, the primary shock shaft also translates axially in a sealed engagement through a passage formed in the bump shaft and is sealed to withhold the oil and nitrogen charge within the shock housing. The bump shaft travels coaxially with the primary shaft.

This second translating shaft or bump shaft, defaults to a deployed position extending from a first end of the shock tube. The bump shaft maintains this extended position from an opening at one end of the body, until the primary shock shaft translates toward and into the compression chamber to a predetermined point such as where a primary shock lower eyelet contacts the secondary or bump shaft. At that point in translation of the primary shaft, the translating bump shaft, which has a larger diameter than the primary shaft, translates into the fluid within the interior cavity of the housing of the shock in a direction toward the compression chamber end. This translation of the bump shaft results in an accelerated displacement of the shock fluid toward the compression chamber end, at a faster rate than is provided solely by translation of the smaller diameter primary shock shaft moving through the fluid which as noted has fluid flow valving components positioned thereon.

This secondary action during the bump shaft displacement of the oil into a shock reservoir, translates a dividing piston within a reservoir cavity. This dividing piston translation compresses the nitrogen charge within the gas reservoir, thereby creating an air spring effect. The shock reservoir includes this dividing piston to maintain the fluid or oil within the compression cavity and rebound cavity of the body of the shock absorber, separated from the nitrogen charge. This prevents cavitation of the fluid or oil which can occur when gas is communicated into fluid. Such cavitation is not desired as it forces small air bubbles in the shock fluid which can be compressed, causing the shock to lose performance due to the loss of viscosity.

The increase in spring rate, through the translation of the bump shaft once engaged, compliments the vehicles primary spring suspension by load sharing during the compression stroke and the rebound stroke. This results in an increase in compression and rebound rate during translation of the bump shaft which is dampened by the existing shock piston and valve with valve shims mounted on the distal end of the primary shock shaft.

In this fashion, the factory-engineered ride quality of the vehicle is not compromised since the bump stop or secondary cushioning components herein are passive and only operate at a point where suspension travel causes translation of the primary shaft of the shock to a predetermined point where an annular member of the primary shaft contacts and causes the translation of the bump shaft.

This predetermined point preferably occurs when the wheel and suspension of the vehicle on which the shock absorber is operatively engaged, has encountered such an event, that a conventional fixed and compressible bump stop would engage to cease movement. Instead of causing contact between two compressible materials of such a bump stop in fixed positions which will jolt the vehicle, the system herein provides a fluid bump stop employing a translating contact with the bump shaft which produces an air spring effect at a rate that is exponential in nature.

Additionally, this translating bump shaft can be tuned by adding fluid or oil into the shock housing and decreasing the area available for the nitrogen gas charge and causing a faster rising pressure rate as the nitrogen charge has less area to compress. Alternatively, the compression and rebound valving can be adjusted by using more or less flexible washers to control oil or fluid movement between the compression chamber and the rebound chamber during use, or by varying the diameter of the compression circuit and/or the rebound circuit.

With respect to the above description, before explaining at least one preferred embodiment of the herein disclosed vehicle shock absorber in detail, it is to be understood that the disclosed shock absorber or dampening system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed shock absorber with translating bump stock. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The accompanying drawings, which are incorporated herein and form a part of the specification, illustrate some, but not the only or exclusive, examples of embodiments and/or features of the vehicle shock absorber invention. It is intended that the embodiments and figures disclosed herein are to be considered illustrative rather than limiting.

In the drawings.

Other aspects of the disclosed vehicle shock absorber invention will be more readily understood when considered in conjunction with the accompanying drawings, and the following detailed description, neither of which should be considered limiting.

DETAILED DESCRIPTION OF THE
PREFERRED EMBODIMENTS OF THE
INVENTION

In this description, the directional prepositions of up, upwardly, down, downwardly, front, back, top, upper, bottom, lower, left, right and other such terms refer to the nose engagement device as it is oriented and appears in the drawings and are used for convenience only; they are not intended to be limiting or to imply that the device has to be used or positioned in any particular orientation.

Figure 1:
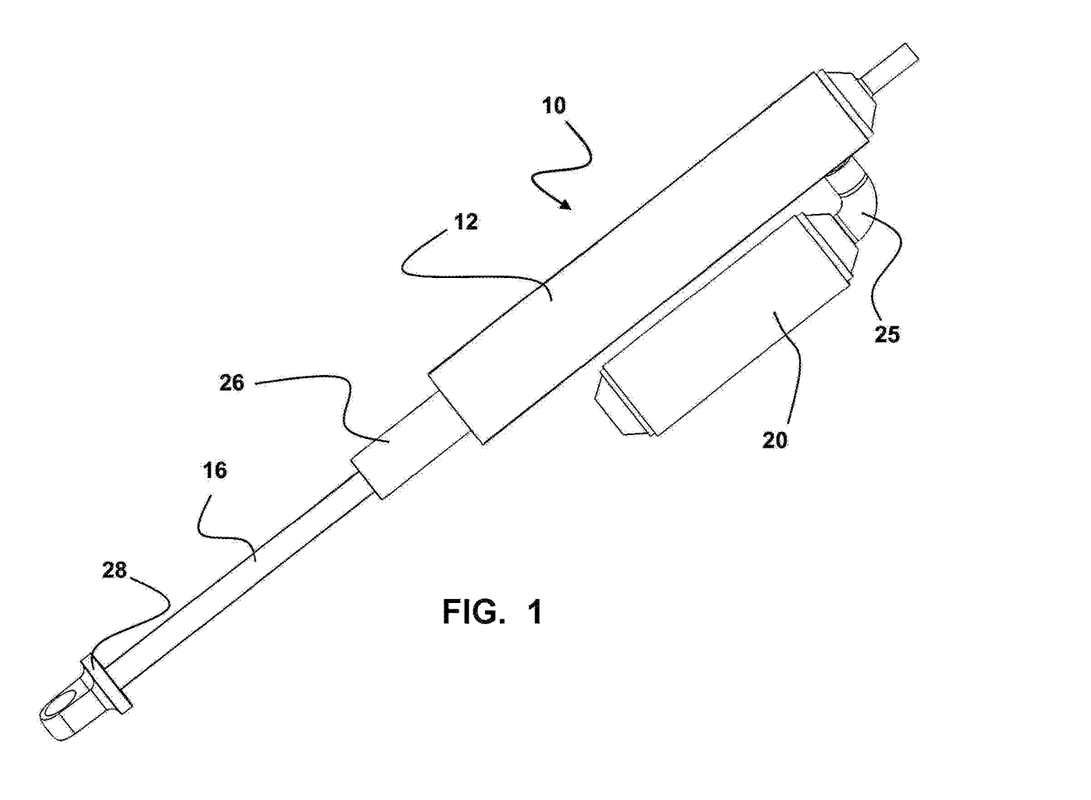
FIG. 1 is a side perspective view of the shock absorber device herein which is also called a damper herein having a secondary reservoir operatively engaged thereto.
Figure 2:
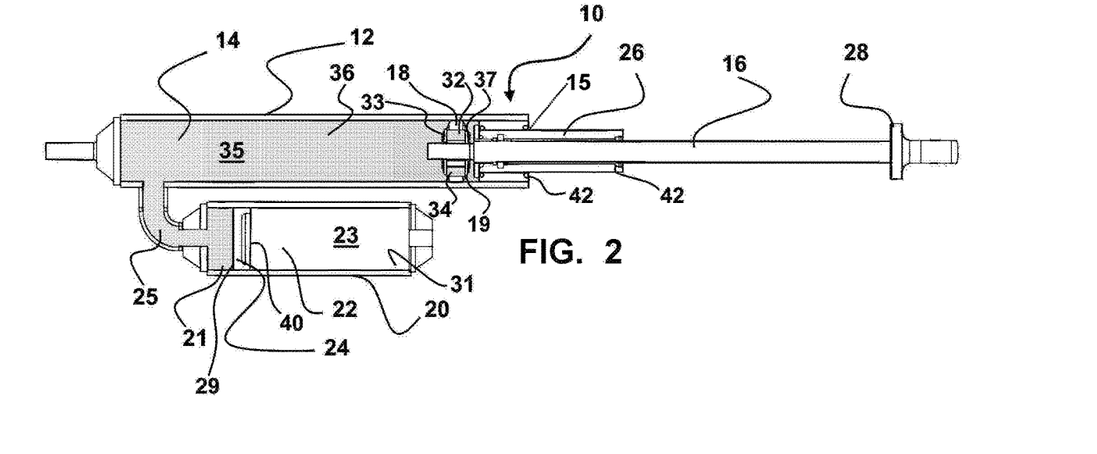
FIG. 2 is a sectional view through the device as shown in FIG. 1, showing the translating components of the shock absorber device herein.

Now referring to drawings in FIGS. 1-6 wherein similar components are identified by like reference numerals, there can be seen in FIG. 1 a side perspective view of the shock absorber device 10 herein. As can be seen in FIG. 1, and FIG. 2, the device 10 has a body 12 surrounding an interior cavity 14. As used herein the term shock absorber can also be called a dampener.

Figure 5:
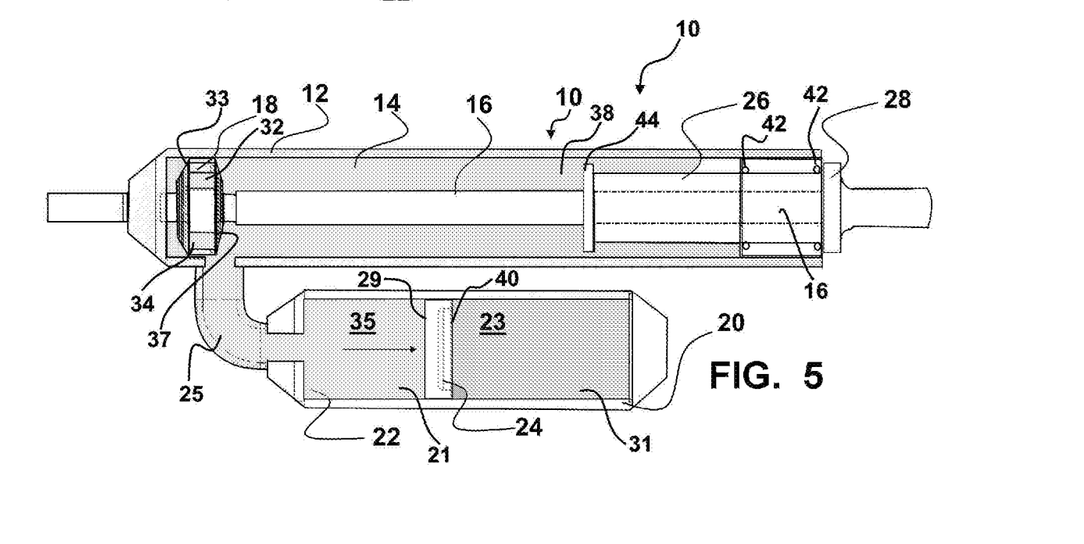
FIG. 5 depicts the primary shaft having translated toward and into the compression chamber end to a point where the bump shaft is contacted by the annular member which translates the bump shaft within the interior cavity toward the compression chamber to thereby cause an accelerated movement of fluid toward the compression chamber of the interior cavity of the shock absorber.

A primary shaft 16 during a dampening movement in a conventional fashion, employs a formed compression circuit 32 and rebound circuit 34 operatively engaged with a valved seal 18. A compression valve 33 controls a volume of fluid 35 communicating from the compression chamber 36 to the rebound chamber 38 to dampen movement of the primary shaft 16 toward and into the compression chamber 36. A rebound valve 37 controls the volume of fluid 35 moving along the rebound circuit 34 past the valved seal 18 between the rebound chamber 38 to the compression chamber 36. As noted, in the current mode of the device 10, both the compression valve 33 and the rebound valve 37 are configured of flexible valve shims 19 which deflect due to the force of fluid pressure communicating through both the compression circuit 32 and a rebound circuit 34 (FIG. 5). These shims 19 are configured to flex and pass fluid at a determined volume when the valved seal 18 engaged on the primary shaft 16, travels through the oil or fluid 35. However, as noted above, while the shims 19 are a conventional manner for forming the compression valve 33 and the rebound valve 37, other configurations may be employed such as valves formed to engage upon the valved seal 18 which are spring biased or in other configurations.

As noted above, the compression chamber 36 is positioned between the valved seal 18 and a second end of the interior cavity 14. The rebound chamber 38 is formed rearward of the valved seal 18, between the valved seal 18 and a bump shaft 26 extending in a sealed engagement through an opening 15 communicating with the interior cavity 14 which is located at a first end of the body 12 and the interior cavity 14. The volume of both these chambers varies due to translation back and forth of the primary shaft 16. Movement of primary shaft 16 when translating in the opening 15 toward the second end of the interior cavity 14 into the fluid 35 in the compression chamber 36, is dampened by the resistance of the volume of fluid communicating through the compression circuit 32 controlled by the compression valve 33. Movement of the primary shaft 16 back toward the rebound chamber 34, is likewise dampened by the restriction of the fluid 35 moving from the rebound chamber 36 through the rebound circuit 34 and rebound valve 37 back into the enlarging compression chamber 36.

During this travel of the primary shaft 16 in both directions, the spring resistance of the metal shims 19, or similar valving, are what control the dampening during travel within fluid, such as oil positioned within the interior cavity 14. Thus, movement of this valved seal 18 through the fluid 35 within the interior cavity 14, provides varied resistance to translation of the primary shaft 16 in both directions.

With the primary shaft 16 being engaged to the body of a vehicle along with the opposite end of the body 12 therefrom, movement of the vehicle suspension is dampened in both directions. Such vehicle suspensions are conventionally supported to a default or stationary position by a coil or leaf spring, and translation of the primary shaft 16 in both directions, thus dampened by the dampened translation of the primary shaft 16 through the fluid 35, thereby preventing bouncing and other undesirable movements of the suspension as the wheel travels over the road surface.

In the device 10 herein, as shown for example in FIGS. 2-5, a secondary reservoir 20 is operatively engaged with the body 12 and has an axial chamber 22 in a fluid communication through a sealed passage 25 with a volume of fluid 25 within the compression chamber 36. This axial chamber 22 is sealed and separated from a gas chamber 23 by a dividing piston 24. This dividing piston 24 translates within the axial chamber 22 and maintains a separation between fluid 35 within the axial chamber 22 which is communicated from the compression chamber 36 side of the interior cavity 14, and fixed volume of gas located within the gas chamber 23 side of the axial chamber 22 on an opposite side of the dividing piston 24.

In normal operation of the shock device 10, translation of the primary shaft 16 concurrently translates under dampened control of the above noted compression valve 33 and rebound valve 37 operatively engaged to with the valved seal 18. The valved seal 18 engaged at or adjacent the distal end of the primary shaft 16, moves through fluid 35 within the interior cavity 14. During such translating travel of the primary shaft 16 and valved seal 18, within the interior cavity 14, if the force from the vehicle suspension causes an increase in speed of translation of the primary shaft 16 toward the compression chamber 36 end of the interior cavity 14, the speed of the translation of the primary shaft 16 can exceed the capacity of fluid 35 to flow through the compression circuit 32 and compression valve 33. When such occurs, a first volume of fluid 35 from the compression chamber 36 side of the interior cavity 14 will communicate into and out of the fluid chamber 21 end of the secondary reservoir 20 thereby increasing the amount of fluid 35 therein by this first volume.

The increase in non compressible fluid 35 by this first volume of fluid, imparts force to the first side surface 29 of the dividing piston 24 causing a translating movement of the dividing piston 24 toward a second side of the secondary reservoir 20. This movement varies depending on the stiffness of the shims 19 controlling the volume of fluid which can communicate over time through the compression valve 33 and rebound valve 37, or the fluid restriction provided by other such compression and rebound valves or seals noted, which may be used to provide dampened translating movement of the primary shaft 16. During the compression cycle of the fluid 35 fluid moves through the compression circuit 32 to the rebound chamber 38, the flow of which is metered by the compression valve 33. As the compression chamber 36 reduces in size, due to primary shaft 16 translation, if the translation is accelerated by force from the vehicle suspension past a point where the fluid 35 can communicate through the compression circuit 32 at a volume rate equaling the reduction in volume of the compression chamber 36, a first volume of fluid 35 or an overflow of fluid 35 from the compression chamber 36 area of the interior cavity 14 is communicated through a passage 25 and into the axial chamber 22. If however the translating movement of the primary shaft 16 toward and into the compression chamber 36 is at a speed where the volume reduction of the compression chamber 36 reduces at a rate equal or less than the fluid flow capacity though the compression circuit 32, then this first volume of fluid will not flow into the axial chamber 22.

Where the first volume of fluid 35 is communicated to the axial chamber 22 due to a speed of the translation of the primary shaft 16, since the fluid 35 communicated in the first volume of fluid through the passage 25 to the fluid chamber 21 of the axial chamber 22 cannot be compressed, the force of the fluid 35 communicated into this fluid chamber 21 exerts an equal force against a first side surface 29 of the dividing piston 24.

This increase in fluid volume by the communication of the first volume of fluid causes a forced translation of the dividing piston 24 in a direction toward a gas cavity 31 formed within the axial chamber 22 between a second side surface 40 of the dividing piston 24 and a second end of the axial chamber 22. This forced translation in turn results in an increase in pressure of the gas within the gas cavity 31 due to the reduction in volume thereof. This increased gas force generates an increasing bias against movement of the dividing piston 24 communicates an additional resistance and dampening of translation of the primary shaft 16 in the direction toward and into the compression chamber 36. At all times, the dividing piston 24 is in sealed communication with the interior wall of the axial chamber 22 and maintains the gas 23 totally separated from the fluid 35.

Figure 3:
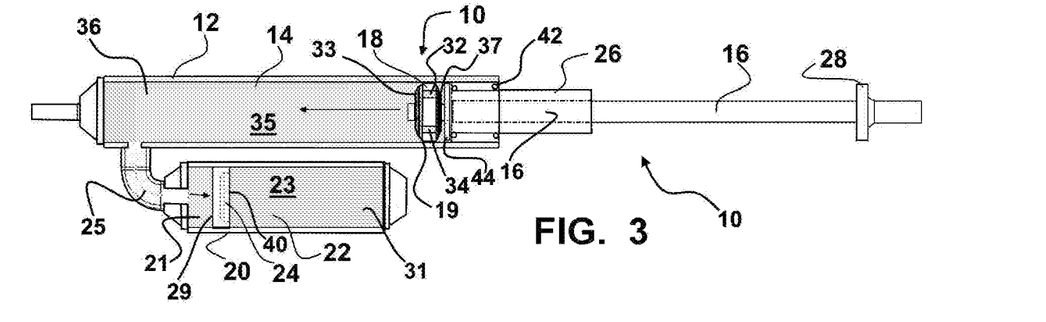
FIG. 3 shows a sectional view showing the primary shaft communicating axially through the interior cavity of the body and coaxially through a passage in the bump shaft, and in a first position fully extending from the shock body.
Figure 4:
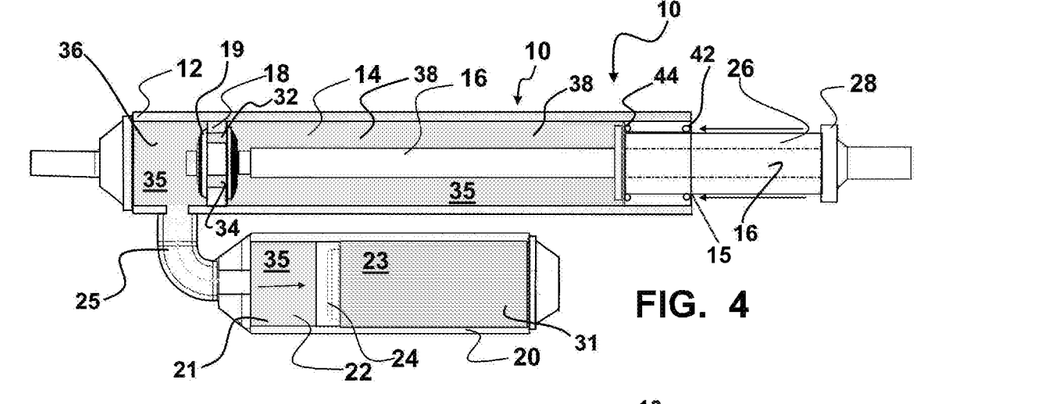
FIG. 4 shows the device as in FIG. 3 where the primary shaft has translated toward the compression chamber at the opposite end of the shock body while concurrently moving a valved seal through fluid within the interior cavity toward a point where the bump shaft is contacted by an annular member as in FIG. 5.

While the above explanation and the drawings of FIG. 2-3 show conventional shock operation, FIGS. 4-5 depict the enhanced dampening operation of the device 10 herein. As shown, the device 10 herein, employs a configuration to also provide for prevention of over-travel of the primary shaft 16 through the interior cavity 14 or over-speed of the translation of the primary shaft 16 in the direction toward the compression chamber 36 end of the interior cavity 14. This over travel can replace or be employed along with a bump stop and is provided by a translating bump shaft 26 which an over speed or fully translated primary shaft will contact with an annular member 28.

As can be seen in FIG. 4, once the primary shaft 16 has traveled a determined distance toward the compression chamber 36 end of the interior cavity 14, in an operative dampening mode through fluid 35 in the compression chamber 36 of the interior cavity 14, contact is made between the annular member 28 projecting from an engagement to the primary shaft 16. This contact is made between this annular member 28 and a first end of the translatably engaged bump shaft 26. This contact is caused by the force of movement of the suspension components to which the device 10 is operatively engaged resulting in a distance and speed of translation of the primary shaft 16.

Because the bump shaft 26 is in a translating sealed engagement with the interior cavity 14 of the body 12 of the shock device 10 herein, the force of the contact of the annular member 28 against the first end of the bump shaft 26 will cause a translation of the bump shaft 26 within the interior cavity 14. During an over speed translation of the primary shaft 16 exceeding the ability of an equal volume of fluid 35 to travel through the compression circuit 32, this contact of the annular member 28 with the bump shaft 26 will occur prior to the full distance of translation of the primary shaft 16 and the valved seal 18, toward and into the compression chamber 36 end of the interior cavity 14. This forced translation of the bump shaft 26 caused by the contact with the annular member 28, causes a second end 44 of the bump shaft 26 to translate a distance toward the compression chamber 36 and to thereby force a secondary volume of fluid 35 from the rebound chamber 38 into the compression chamber 36 located within the interior cavity 14. This secondary volume of fluid forced from the rebound chamber 38 to the compression chamber 36 travel through the passage 25 and into the fluid chamber 21 of the secondary reservoir 20.

This movement of this secondary volume of fluid into the fluid chamber 21 of the secondary reservoir 20 from the over speed translation and force of the translating bump shaft 26, causes an increased rate of translating movement of the dividing piston 24, and concurrent increase in compression of the gas on the opposite side of the dividing piston 24. The resistance force exerted by the increasing compression of gas within the gas cavity 31 of the second reservoir 20 against the dividing piston 24 increases in force as the bump shaft 26 is translated a distance further into the interior cavity 14 and increases the amount of the secondary volume of fluid forced into the fluid chamber 21. This increasing resistance from the gas compression within the second reservoir 20, provides an increasing resistance to the primary shaft 16 translation to prevent over travel thereof and to dampen excess force communicated from the road surface to the suspension of the vehicle to which the device 10 herein is engaged.

Figure 6:
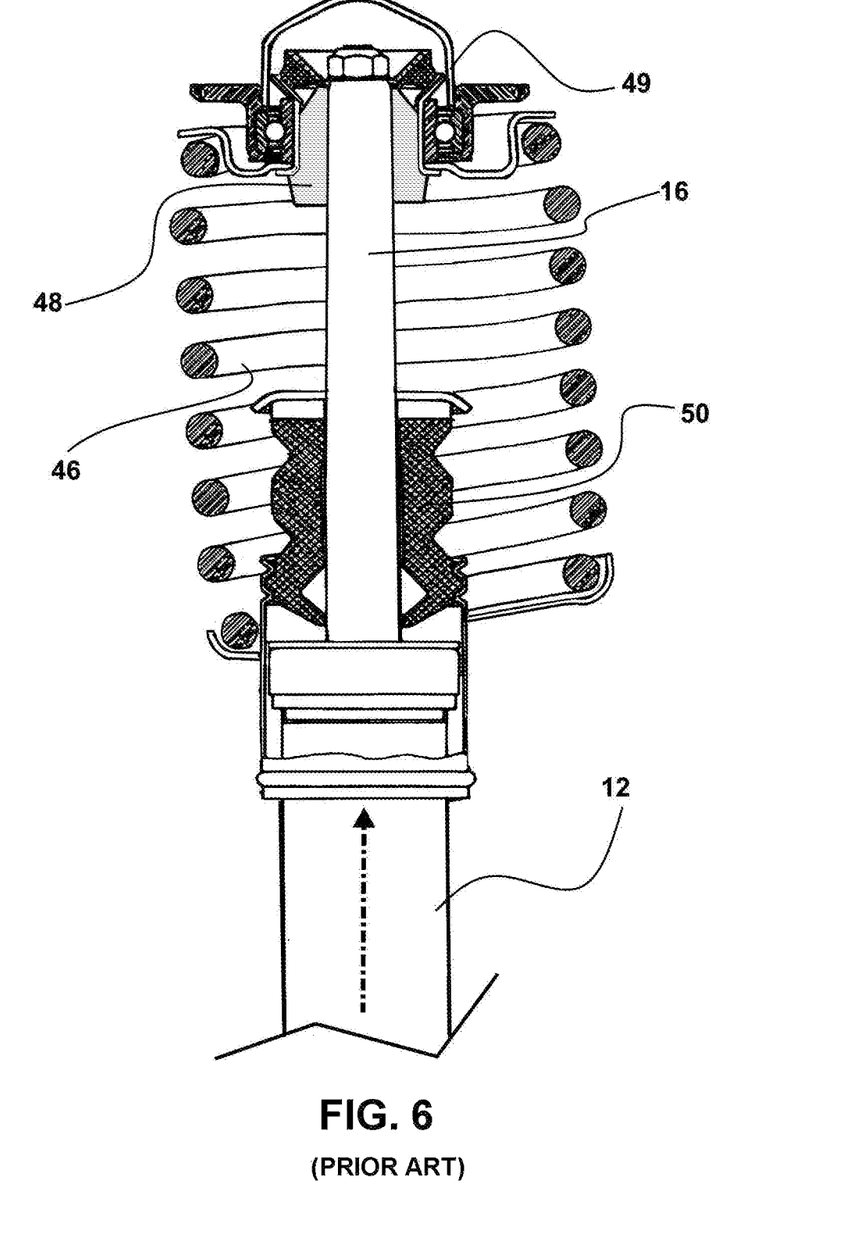
FIG. 6 depicts a well known conventional configuration of a vehicle shock absorber having a fixed bumper stop which either moves or compresses and stops movement of the shock body once full translation of the primary shaft with the body of the shock absorber has occurred.

As noted, FIG. 6 depicts a well known conventional configuration of a vehicle shock absorber having a body 12 which is operatively engaged with the suspension using a spring 46 such as a coiled or leaf spring. As shown in FIG. 6 and described herein, such conventional suspensions employ either a fixed bumper stop 48 on the frame 49 of the vehicle or a compressible or other bump stop 50 on the shock or combinations thereof, to protect the shock and suspension once the full translation of the primary shaft 16 within the body 12 of the shock absorber has occurred. The bumper stop 48 is formed of rubber or neoprene or another polymeric material to help pad the suspension from a metal on metal or full force of a large impact.

This results in a fluid travel and gas compression dampened prevention of both over-speed and over-travel of the primary shaft 16, and eliminates the conventional jarring impact upon the vehicle suspension caused by a fixed bump stop. As noted above, this results in a significantly enhanced ride from that of a conventional fixed padded bump stops employed with conventional shock absorbers as well as enhanced control over the vehicle during use.

While all of the fundamental characteristics and features of a vehicle suspension shock absorber with a translating bump stop invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A vehicle shock absorber comprising: a body having a first end and a second end opposite said first end;

an interior cavity running axially within said body in between an opening at said first end and said second end;

a bump shaft in a sealed engagement with said interior cavity, said bump shaft having an extending portion projecting a distance away from said opening to a first end thereof;

said bump shaft having a second end positioned within said interior cavity;

said bump shaft having a passage therethrough running coaxial to said interior cavity;

said bump shaft being translatable within said interior cavity;

a primary shaft having a first end opposite a second end;

said primary shaft in a translating engagement within said passage;

a valved seal located at said second end of said primary shaft, said valved seal being in a sealed engagement thereof with a wall surface of said interior cavity;

said interior cavity in-between said valved seal and said second end of said body defining a compression chamber;

said interior cavity in-between said valved seal and said second end of said bump shaft defining a rebound chamber;

said compression chamber and said rebound chamber both having fluid therein;

a secondary reservoir having a first end and a second end and having an axial chamber therein;

said axial chamber having a translating dividing piston in sealed engagement therein;

a first portion of said axial chamber between said first end of said secondary reservoir and said dividing piston defining a fluid chamber;

said fluid chamber being filled with said fluid;

a second portion of said axial chamber positioned between said dividing piston and said second end of said secondary reservoir defining a gas cavity;

said gas cavity filled with gas;

a passage communicating between said compression chamber and said fluid chamber;

a translation of said primary shaft for a first distance toward said second end of said body communicating a first volume of said fluid within said compression chamber into said fluid chamber;

communication of said first volume of said fluid to said fluid chamber generating a first force upon said dividing piston to translate it toward said second end of said secondary reservoir to cause a first increase in gas pressure of said gas within said gas cavity;

a member engaged to said primary shaft at a position thereon in-between said opening and said first end of said primary shaft;

a contact of said member against said first end of said bump shaft during a secondary portion of said translation of said primary shaft toward said second end of said body, translating said bump shaft in a first direction toward said second end of said body;

said translation of said bump shaft in said first direction communicating a second volume of said fluid through said passage into said fluid chamber;

communication of said second volume of said fluid to said fluid chamber generating a secondary force upon said dividing piston to translate it toward said second end of said secondary reservoir, thereby causing a secondary increase in said gas pressure of said gas within said gas cavity;

said first increase in gas pressure imparting a first biasing force to said piston to translate it toward said first end of said secondary reservoir and thereby force said first volume of said fluid to return to said compression chamber;

said secondary increase imparting a second piston force against said fluid within said fluid chamber to force said first volume of said fluid to return to said compression chamber; and said secondary increase in gas pressure imparting a secondary biasing force to said piston to translate it toward said first end of said secondary reservoir to thereby force said first volume of said fluid to return to said compression chamber.

2. The vehicle shock absorber of claim 1, additionally comprising:

a compression fluid circuit communicating said fluid between said compression chamber and said rebound chamber during said translation of said primary shaft toward said second end of said body;

a rebound fluid circuit communicating said fluid between said rebound chamber and said compression chamber during a secondary translation of said primary shaft in a direction toward said first end of said body;

a first rate of fluid flowing through said compression fluid circuit imparting a dampening of movement of said primary shaft during said translation thereof toward said second end; and a second rate of fluid flowing through said rebound fluid circuit imparting a dampening of movement of said primary shaft during said translation thereof toward said first end of said body.

3. The vehicle shock absorber of claim 2, additionally comprising:

a compression valve engaged with said compression fluid circuit, said compression valve controlling a volume of said fluid communicating through said compression circuit; and a rebound valve engaged with said rebound fluid circuit, said rebound valve controlling a volume of said fluid communicating through said rebound circuit.

4. A vehicle shock absorber comprising:

a body having a first end and a second end opposite said first end;

an interior cavity running axially within said body from an opening at said first end to said second end;

a bump shaft in a sealed engagement with said interior cavity;

said bump shaft having an extending portion projecting a distance away from said opening to a first end thereof, said bump shaft having a second end positioned within said interior cavity;

said bump shaft having a passage therethrough running coaxial to said interior cavity;

said bump shaft being translatable within said interior cavity;

a primary shaft having a first end opposite a second end;

said primary shaft in a translating engagement within said passage;

a valved seal located at said second end of said primary shaft;

said interior cavity in-between said valved seal and said second end of said body defining a compression chamber;

said interior cavity in-between said valved seal and said second end of said bump shaft defining a rebound chamber;

said compression chamber and said rebound chamber both having fluid therein;

communication of said fluid from said compression chamber through said valved seal during a first portion of translation of said primary shaft in a first direction toward said second end of said interior cavity, imparting a first dampening force to resist such translation in said first direction;

a member engaged to said primary shaft at a position thereon in-between said opening and said first end of said primary shaft;

a contact of said member against said first end of said bump shaft during a secondary portion of said translation of said primary shaft toward said second end of said body, imparting a translation to said bump shaft in a first direction thereof, toward said second end of said interior cavity; and contact of said second end of said bump shaft with said fluid in said rebound chamber during said translation of said bump shaft in said first direction, generating a second dampening force to resist said translation of said primary shaft in said first direction which is communicated to said primary shaft during said contact of said member against said first end of said bump shaft, whereby over travel of said primary shaft is prevented.

5. The vehicle shock absorber of claim 4 additionally comprising:

said valved seal including a compression valve for controlling a volume of said fluid communicating from said compression chamber through said valved seal.

6. The vehicle shock absorber of claim 4 additionally comprising:

said valved seal including a rebound valve for controlling a volume of said fluid communicating through said valved seal from a rebound chamber positioned in-between said valved seal and said second end of said bump shaft, to said compression chamber.

7. The vehicle shock absorber of claim 6 additionally comprising:

said valved seal including a rebound valve for controlling a volume of said fluid communicating through said valved seal from a rebound chamber positioned in-between said valved seal and said second end of said bump shaft to said compression chamber.

* * * * *